Patented May 5, 1942

2,282,294

UNITED STATES PATENT OFFICE 2,282,294

PROCESS FOR IMPROVING THE COLOR OF CAUSTIC ALKALI SOLUTIONS

John S. Coey, Niagara Falls, N. Y., assignor to Hooker Electrochemical Company, Niagara Falls, N. Y., a corporation of New York No Drawing. Application January 29, 1941, Serial No. 376,497

6 Claims. (Cl. 23—184)

My invention relates more particularly to a process for preventing or destroying the pink, blue and green discoloration and fluorescence which is liable to develop in caustic alkali solutions, and especially caustic soda solutions which have been produced in electrolytic cells employing graphite anodes, asbestos diaphragms and iron cathodes, upon exposure to actinic light.

The cause of this discoloration is not fully understood. It has been observed that such caustic soda solutions, and even very pure solutions that have been prepared from melted crystals, which solutions are colorless by ordinary white light, sometimes show a tendency to turn green under sunlight and glow in the dark under ultra violet light with a greenish luminescence. From this it has been assumed that the colors are purely an effect of fluorescence and due to ultra violet light. However, that this is not wholly true is proven by the fact that the green color and fluorescence develop in such solutions when contained in lead glass bottles which are nearly opaque to ultra violet.

The fluorescence of caustic alkalis has been discussed by Grombach and Bibaillier in "Photo-luminescence de la Soude et de la Potasse," Comptes Rendus, vol. 198. The authors of this paper experimented not only with caustic soda and potassium, but with the metals themselves. They used very pure samples, and thus studied only one phase of the phenomena. They obtained blue, green, and orange luminescence and phosphorescence, which they found to be activated by moderate heat, but transitory and destroyed by calcination. The only impurities found in the samples were formates and carbonates. From this they concluded that the phenomena were due entirely to these two impurities. They observed no pink discoloration and were apparently unaware of the discoloration of solutions that are not fluorescent. My observations lead me to conclude that the impurities mentioned by the authors of this paper are not the cause, or not the only cause, of the discoloration of caustic alkalis. In fact there are indications in some cases that the colors are due to definite colored chemical compounds.

The behavior of cell effluent from electrolytic cells of identical design operating on electrolyte from a single source varies greatly with respect to the phenomena under consideration. The effluent from such cells, containing about 10 per cent NaOH and 15 per cent NaCl, is generally colorless upon issuing from the cell, but upon standing and exposure to actinic light it will in many cases turn pink. Occasionally, however, a cell is found the effluent from which is a bright pink as it issues from the cell, before it has been subjected to light at all. On the other hand, occasionally a cell is found the effluent from which remains colorless indefinitely in sunlight. These latter exceptional cells are generally those which have been in operation only a few hours, or, on the other hand, long enough to be approaching the time when it will be necessary to renew the diaphragm, upon which a coating of fine granular material has built up.

If the cell effluent which shows a tendency to turn pink upon exposure to sunlight be concentrated by evaporation in contact with air, without exposure to light, it will turn pink when the concentration reaches about 18 per cent. However, if the air be excluded, the pink color will be much less pronounced. This suggests that the development of the pink color is an oxidation effect that can be catalyzed by heat or concentration, as well as by light. Cell effluent which remains colorless under sunlight will be nearly colorless when evaporated to 18 per cent solution in the manner above described.

If the pink 18 per cent solution be further concentrated, in contact with air, with or without exposure to light, when the concentration reaches about 36 per cent the solution will often be found to have turned blue, and this color will persist as the concentration proceeds up to the 50 to 70 per cent solution of commerce. These colors are the same whether the concentration be carried out in iron or nickel. However, if air be excluded during this concentration from 18 to 50 per cent, the solution, whether initially colorless or pink, will remain so. This would seem to indicate that this change in color, like the first, occurs under oxidizing conditions. However, the color can be destroyed by a further oxidation, as by means of NaClO.

It should be noted that during the concentration of the solution the NaCl of the cell effluent is largely thrown out of solution and removed.

The pink cell effluent and 18 per cent solution and the blue solution show their characteristic colors in lead glass bottles which are nearly opaque to ultra violet; hence these colors are more or less independent of fluorescence. Nevertheless, the blue solution produced by concentration of cell effluent that is already pink or tends to turn pink under sunlight is found to be fluorescent, glowing with a greenish light in the dark under ultra violet radiation. If not exposed to this radiation too long, it again appears blue by white daylight. Under this radiation, however, it gradually loses its blue color altogether and thereafter appears green by white daylight. The green solution, like the blue, glows with a greenish luminescence in the dark under ultra violet radiation.

The cell effluent that shows a tendency to turn pink upon exposure to sunlight generally turns blue during evaporation to 50 per cent solution and upon exposure to actinic light develops a greenish fluorescence. The pink color, or tendency of the cell effluent to turn pink in sunlight, and the blue color and the greenish fluorescence of the 50 per cent solution made from such cell effluent appear to be closely related. In extreme cases enough pink may remain to give the 50 per cent solution a purple color. This indicates that all the phenomena may have the same origin, and this may be in the cell.

It has been noted that samples of caustic soda solutions made in the same cells and under the same conditions as those which now produce the colored fluorescent solutions, but which have been stored in glass bottles for several years, are now colorless and non-fluorescent. This indicates that these phenomena are not permanent.

The pink color of cell effluent can be destroyed by oxidizing agents but upon exposure to sunlight it promptly returns; also upon concentration the solution so treated will show the pink and blue colors, and the concentrated solution will develop the green color and fluorescence upon exposure to sunlight. The blue color of the concentrated solution may likewise be destroyed by oxidation, but the solution will nevertheless develop the green fluorescence under the same conditions. The green fluorescent solution may be more or less decolorized by oxidation but if the oxidizing agent be allowed to exhaust itself in the dark and the solution be again exposed to sunlight the green color and fluorescence will generally partially reappear. It has therefore been hitherto supposed that, in order permanently to eliminate the green color and fluorescence, it was necessary to irradiate the solution until the fluorescence had been completely developed, before decolorizing the solution by means of the oxidizing agent. This treatment destroys the green color and fluorescence and produces a solution that appears colorless by ordinary light and is little affected even by sunlight. However, I have found that, under the ultra violet lamp, the solution that has been so treated exhibits a new phenomenon, namely a blue fluorescence. This solution which exhibits a blue fluorescence under ultra violet light but is colorless under white daylight should not be confused with the solution that is blue under white daylight but shows a green fluorescence under ultra violet.

I have now discovered that the green color and fluorescence need never be allowed to develop, and in fact that it can be prevented from ever developing, if instead of first irradiating the blue solution and then oxidizing it, as heretofore practised, the oxidizing agent be added to the blue solution and the solution be then irradiated in presence of the oxidizing agent. The effect of this treatment is of course to oxidize contaminants which tend to give the solution its green color and fluorescence to a form in which they are colorless, substantially non-fluorescent and stable. Although actinic light is generally believed to catalyze reduction reactions, it may promote oxidation by helping to reduce the oxidizing agent and thus to set free the oxygen. At any rate, the oxidizing agent exhausts itself much more rapidly if present during irradiation than if added afterward. If the agent be in sufficient amount and if the irradiation be continued to exhaustion of the agent, the solution is bleached colorless and will remain so indefinitely even under bright sunlight. Moreover, under the ultra violet lamp it exhibits the blue fluorescence extremely slightly, if at all.

In carrying out my process, I may add $H_2O_2$, NaClO, or $NaClO_2$ or I may bubble air or oxygen through the solution. After adding the oxidizing agent, any delay in irradiating is disadvantageous and I prefer to add the oxidizing agent and irradiate immediately.

As between these four agents I prefer to use NaClO. I prefer to add a sufficient quantity of this reagent to the blue solution to ensure that after the solution has been bleached there shall remain a substantial excess of unreacted oxidizing agent, which is allowed to exhaust itself during the irradiation. In practice, the quantity found to be necessary is from 50 to 250 parts of available oxygen per million parts of NaOH, depending upon the depth of the color. The time of irradiation of course depends upon the quality and intensity of the light and type of apparatus used.

*Example*

A sample of blue solution, produced by concentrating cell liquor in an evaporator in the above described manner, and containing 49.78 per cent NaOH and 18.65 parts NaCl, 2.4 parts $NaClO_3$, .0093 part iron, .0014 part copper, and .0002 part nickel, per 1000 parts NaOH, was divided into two equal portions. To one of these portions were added 107.5 parts available oxygen as NaClO, per million of NaOH. Both portions were then exposed to ultra violet radiation for 4 hours. At the end of that time the first portion was colorless, the second portion green and fluorescent. An equal quantity of NaClO was then added to the second portion. At the end of 1 hour, or 5 hours from the start, it too was colorless. The NaClO in the first portion had exhausted itself during the first 3 hours of exposure to the light. The NaClO in the second portion required 6 hours longer, or 10 hours from the start of the process, in which to exhaust itself. Both portions were then placed in semi-darkness. Six weeks later both portions, which were still colorless by white daylight, were exposed to the same ultra violet radiation. The portion treated in accordance with my process was unaffected. It did not fluoresce or develop color. The sample treated in accordance with the process of the prior art exhibited a faint but unmistakable bluish fluorescence, showing that, while the fluorescence had been modified, it had not been completely eliminated.

In this example no significance is to be attached to the time of exposure, as that is a function of the intensity of the radiation and the depth of the liquid layer. Suffice it to say that the lamp used and depth of liquor were the same in both cases. It may be of interest to note, however, that the quantity of solution in each case was 1,200 cc. and the total energy consumed in each case 400 watt-hours or 333 watt-hours per liter. The equipment used was a 100 watt General Electric Company B-H4 mercury Mazda lamp, which was directed downwardly upon the surface of a body of the solution 127 millimeters deep.

It will therefore be seen that in 3 hours total elapsed time the NaClO in the portion treated in accordance with my process was completely exhausted. The irradiation was continued for another hour merely to preserve the exact parallel between the two cases. The portion treated in accordance with the prior art, on the other hand, not only required to be irradiated for a 33⅓ per cent longer period, but also required a further period for exhaustion of the NaClO, bringing the total period of treatment up to 3⅓ times the period required by my process. Finally, notwithstanding this longer and more expensive treatment, the portion treated in accordance with the prior art proved to have been less effectively cured of the tendency to fluoresce.

I consider that this example proves my process to be more effective than that of the prior art for a given irradiation or, conversely, equally effective with substantially less irradiation. Many other examples could be given, using different quantities of oxidizing agent and different times or intensities of ultra violet radiation, all with the same comparative result.

It will be obvious that, until the added oxidizing agent has completely exhausted itself, the solution of the prior art cannot be used in any other process, as the excess oxidizing agent would be liable to play havoc with such process. If the solution is irradiated in presence of the oxidizing agent, on the other hand, as in my process, it may be used as soon as irradiated, with full assurance that no oxidizing agent will remain in it to ruin products subsequently produced from it, such for example, as sodium cellulose.

In the example above given, the solution had not been exposed to sunlight before treatment. My process is, however, equally applicable to solution that has been casually exposed to ordinary light and already turned more or less green, without having been irradiated for the purpose of fully developing the green color and fluorescence.

Just what reaction is involved in the treatment that finally and permanently destroys the color and tendency to fluorescence is not at present known. As I do not intend to be held to any particular theory as to the reactions involved in my process, this is in any case not particularly important.

In the example the irradiation was continued until complete exhaustion of the oxidant and longer. It will be obvious, however, that if a greater quantity of oxidant had been added it might not have been completely exhausted during the period of irradiation. Nevertheless the result sought would have been accomplished. The only disadvantage would be that an excess of oxidant would be left to exhaust itself slowly as in the prior art. I do not wish to be limited, therefore, to irradiating to complete exhaustion of the oxidant. Neither do I wish to be limited to any particular time of irradiation or any particular result, since treatment of the solution, in accordance with my process, by any quantity of oxidant, under the simultaneous action of actinic light, will benefit the solution more or less. I may say however, that for the solution to receive substantial benefit from the treatment the minimum quantity of available oxygen is probably 50 parts per million of caustic soda and the minimum irradiation, in presence of the oxidizing agent, for the same quantity of caustic soda, such as would be represented by an expenditure of 50 watt-hours of energy in the ultra violet range per liter of solution.

I claim as my invention:

1. In the treatment of solutions of caustic soda that have been produced in electrolytic diaphragm cells and which upon concentration, with no more than incidental exposure to light, and that to relatively weak diffused light only, will develop a bluish color that can be destroyed by oxidation, and afterward, if effectively exposed to actinic light, will develop a greenish fluorescence, the process for destroying the bluish color and tendency to develop greenish fluorescence which comprises adding to the concentrated solution, unexposed to actinic light of effective intensity, a soluble oxidizing agent decomposing to yield oxygen and leave a colorless compound normally present in such solutions, in amount substantially more than sufficient to destroy the bluish color, and exposing the solution to relatively intense rays of actinic light, until oxidizing agent has been decomposed in excess of the amount necessary to destroy the bluish color.

2. In the treatment of solutions of caustic soda that have been produced in electrolytic diaphragm cells and which upon concentration, with no more than incidental exposure to light, and that to relatively weak diffused light only, will develop a bluish color that can be destroyed by oxidation, and afterward, if effectively exposed to actinic light, will develop a greenish fluorescence, the process for destroying the blush color and tendency to develop greenish fluorescence which comprises adding to the concentrated solution, unexposed to actinic light of effective intensity, a soluble oxidizing agent decomposing to yield oxygen and leave a colorless compound normally present in such solutions, in amount substantially more than sufficient to destroy the bluish color, and exposing the solution to relatively intense rays of actinic light until the oxidizing agent has been substantially completely decomposed.

3. In the treatment of solutions of caustic soda that have been produced in electrolytic diaphragm cells and which upon concentration, with no more than incidental exposure to light, and that to relatively weak diffused light only, will develop a bluish color that can be destroyed by oxidation, and afterward, if effectively exposed to actinic light, will develop a greenish fluorescence, the process for destroying the bluish color and tendency to develop greenish fluorescense which comprises adding to the concentrated solution, unexposed to actinic light of effective intensity, a soluble oxidizing agent of the group consisting of hydrogen peroxide, sodium hypochlorite and sodium chlorite, in amount substantially more than sufficient to destroy the bluish color, and exposing the solution to relatively intense rays of actinic light, until oxidizing agent has been decomposed in excess of the amount necessary to destroy the bluish color.

4. In the treatment of solutions of caustic soda that have been produced in electrolytic diaphragm cells and which upon concentration, with no more than incidental exposure to light, and that to relatively weak diffused light only, will develop a bluish color that can be destroyed by oxidation, and afterward, if effectively exposed to actinic light, will develop a greenish fluorescence, the process for destroying the bluish color and tendency to develop greenish fluorescence which comprises adding to the concentrated solution, unexposed to actinic light of effective intensity, a soluble oxidizing agent decomposing to yield oxygen and leave a colorless compound normally present in such solutions, in such amount as will be substantially more than sufficient to destroy the bluish color but will nevertheless contain not less than 50 parts of available oxygen per million parts of caustic soda, by weight, and exposing the solution to relatively intense rays of actinic light until oxidizing agent has been decomposed substantially in excess of the amount necessary to destroy the bluish color.

5. In the treatment of solutions of caustic soda that have been produced in electrolytic diaphragm cells and which upon concentration, with no more than incidental exposure to light, and that to relatively weak diffused light only, will develop a bluish color that can be destroyed by oxidation, and afterward, if effectively exposed to actinic light, will develop a greenish fluorescence, the process for destroying the bluish color and tendency to develop greenish fluorescence which comprises adding to the concentrated solution, unexposed to actinic light of effective intensity, a soluble oxidizing agent decomposing to yield oxygen and a colorless compound normally present in such solutions, in such amount as will be substantially more than sufficient to destroy the bluish color but will nevertheless contain not less than 50 nor more than 250 parts of available oxygen per million parts of caustic soda, by weight, and exposing the solution to relatively intense rays of actinic light until oxidizing agent has been decomposed substantially in excess of the amount necessary to destroy the bluish color.

6. In the treatment of solutions of caustic soda that have been produced in electrolytic diaphragm cells and which upon concentration, with no more than incidental exposure to light, and that to relatively weak diffused light only, will develop a bluish color that can be destroyed by oxidation, and afterwards, if effectively exposed to actinic light, will develop a greenish fluorescence, the process for destroying the bluish color and tendency to develop greenish flourescence which comprises adding to the concentrated solution, unexposed to actinic light of effective intensity, a soluble oxidizing agent decomposing to yield oxygen and a colorless compound normally present in such solutions, in amount substantially more than sufficient to destroy the bluish color, and exposing the solution to rays of light energy actinically equivalent to substantially that generated by not less than 400 watt-hours of electrical energy in a 100 watt mercury ultra-violet lamp, directed downwardly upon the surface of a body of 1,200 cc. of substantially 50 per cent solution, 127 millimeters deep.

JOHN S. COEY.